United States Patent
Xiong et al.

(10) Patent No.: US 12,192,566 B2
(45) Date of Patent: Jan. 7, 2025

(54) AUTOMATIC CONFIGURATION OF SUB-DISPLAY POSITIONS IN MULTI-STREAM TRANSPORT MODE

(71) Applicant: DELL PRODUCTS L.P., Round Rock, TX (US)

(72) Inventors: Dengzhai Xiong, Singapore (SG); Thomas Tze Fung Chung, Singapore (SG); Vui Khen Thien, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/307,315

(22) Filed: Apr. 26, 2023

(65) Prior Publication Data

US 2024/0364957 A1    Oct. 31, 2024

(51) Int. Cl.
*G09G 5/14*     (2006.01)
*G09G 5/00*     (2006.01)
*H04N 21/41*    (2011.01)
*H04N 21/431*   (2011.01)

(52) U.S. Cl.
CPC ......... *H04N 21/4312* (2013.01); *G09G 5/006* (2013.01); *H04N 21/4108* (2013.01)

(58) Field of Classification Search
CPC ....................... H04N 23/63; G09G 2320/0626
See application file for complete search history.

(56) References Cited

U.S. PATENT DOCUMENTS

| | | | |
|---|---|---|---|
| 9,596,493 B2 | 3/2017 | Nix | |
| 10,854,170 B2 | 12/2020 | Khen et al. | |
| 2008/0136628 A1* | 6/2008 | Ishii | H04N 7/181 348/143 |
| 2009/0135199 A1* | 5/2009 | Okamoto | G06F 3/1431 345/619 |
| 2010/0199227 A1* | 8/2010 | Xiao | G06F 3/0481 715/863 |
| 2020/0302894 A1* | 9/2020 | Khen | G09G 5/14 |

* cited by examiner

*Primary Examiner* — Nan-Ying Yang
(74) *Attorney, Agent, or Firm* — Larson Newman, LLP

(57) ABSTRACT

In response to detecting that a display device is in a multi-stream transport mode, an information handling system determines a display partition layout of the display device. The system transmits setup display patterns according to the display partition layout of the display device, wherein the setup display patterns include a first display pattern and a second display pattern, wherein the first display pattern is associated with a first display partition, and wherein the second display pattern is associated with a second display partition. In response to determining that the first display pattern should be associated with the second display partition and that the second display pattern should be associated with the first display partition, the system associates the first display pattern with the second display partition and associates the second display pattern with the first display partition.

20 Claims, 8 Drawing Sheets

| MST Layout Number | MST Layout | Description |
|---|---|---|
| MST Layout No. 1 | | 2 partitions @ 1920 x 2160 pixels each |
| MST Layout No. 2 | | 2 partitions @ 3840 x 1080 pixels each |
| MST Layout No. 3 | | 3 partitions @ 1280 x 2160 pixels each |
| MST Layout No. 4 | | Left: 2 partitions @ 1920 x 1080 pixels each<br>Right: 1 partition @ 1920 x 2160 pixels |
| MST Layout No. 5 | | Left: 1 partitions @ 1920 x 260 pixels each<br>Right: 2 partitions @ 1920 x 1080 pixels each |
| MST Layout No. 6 | | Top: 1 partition @ 3840 x 1080 pixels each<br>Bottom: 2 partitions @ 1920 x 1080 pixels each |
| MST Layout No. 7 | | Top: 2 partitions @ 1920 x 1080 pixels each<br>Bottom: 1 partition @ 3840 x 1080 pixels each |
| MST Layout No. 8 | | 4 partitions @ 1920 x 1080 pixels each |

FIG. 10

AUTOMATIC CONFIGURATION OF SUB-DISPLAY POSITIONS IN MULTI-STREAM TRANSPORT MODE

FIELD OF THE DISCLOSURE

The present disclosure generally relates to information handling systems, and more particularly relates to automatic configuration of sub-display positions in multi-stream transport mode.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

In response to detecting that a display device is in a multi-stream transport mode, an information handling system determines a display partition layout of the display device. The system transmits setup display patterns according to the display partition layout of the display device, wherein the setup display patterns include a first display pattern and a second display pattern, wherein the first display pattern is associated with a first display partition, and wherein the second display pattern is associated with a second display partition. In response to determining that the first display pattern should be associated with the second display partition and that the second display pattern should be associated with the first display partition, the system associates the first display pattern with the second display partition and associates the second display pattern with the first display partition.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 10 shows a table that maps a list of partition sizes and number of partitions to MST layouts, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
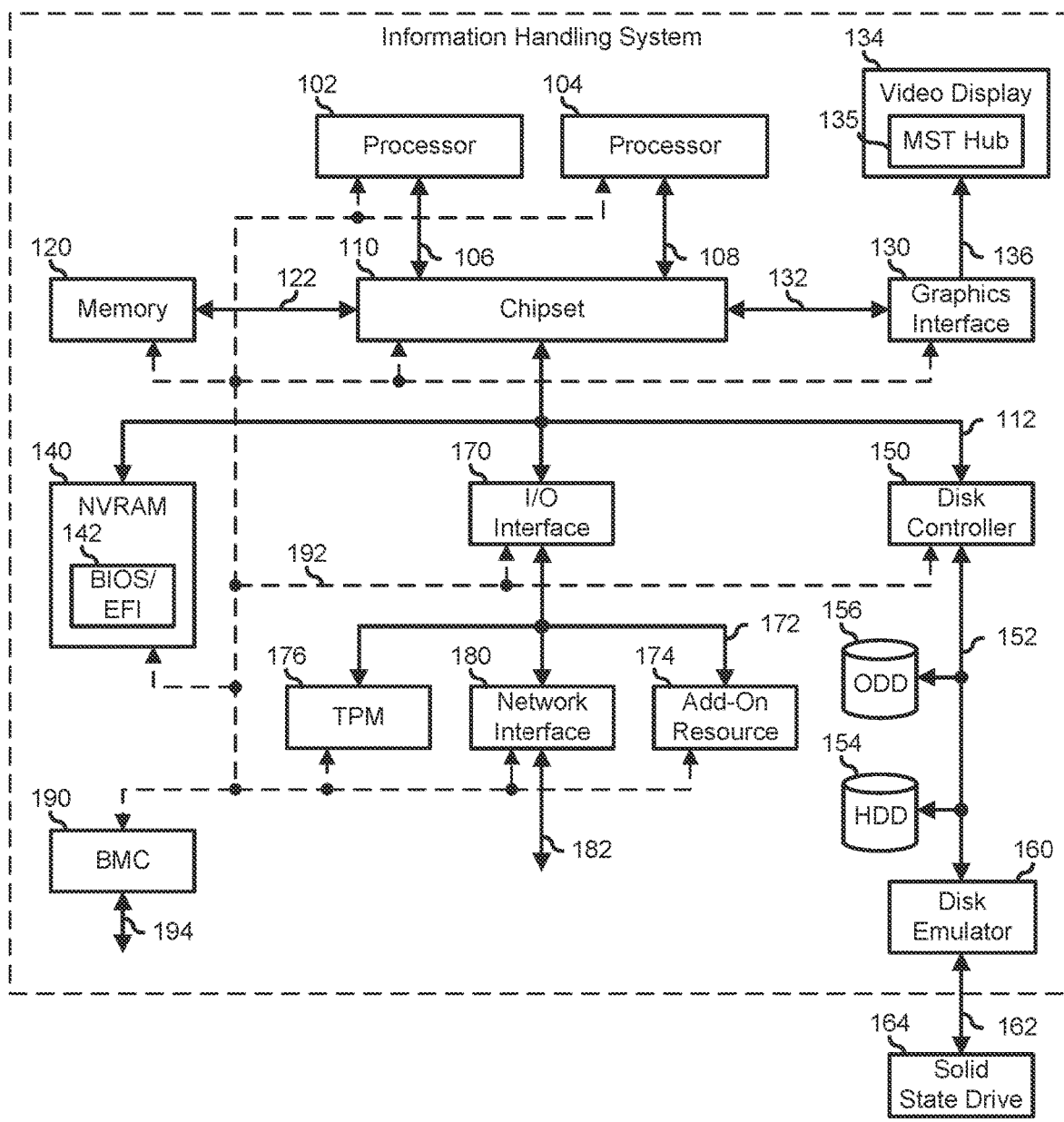
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134, with an integrated multi-stream transport (MST) hub 135. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort™ interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Multi-stream transport (MST) is used to simulate tiled displays on a display panel. When in an MST mode, an MST hub is connected to multiple sinks within a display interface board. The display panel is divided into several partitions and a display controller stitches images from each sink. The images are transmitted to the display panel via a single display cable. The images from each sink are displayed in one of the partitions. Thus a display panel that is divided into four partitions may have four sub-displays, where each sub-display is a display from a different sink. The sub-displays are enumerated as multiple physical displays by an operating system. However, the operating system may have no knowledge about the edge-to-edge adjacency of the sub-displays. In addition, the operating system may have no knowledge of the positions of the sub-displays without a user initially configuring the positions of the sub-displays via a user interface. For example, the user generally has to arrange the screen layout of the operating system so that it matches that of the display panel. Thus unless the position of the sub-displays is pre-defined by the user, enumerated displays are transmitted by the operating system in no particular order and may be displayed in random positions in the display panel. To address these and other concerns, the present disclosure provides an automatic configuration of the sub-displays.

Figure 2:
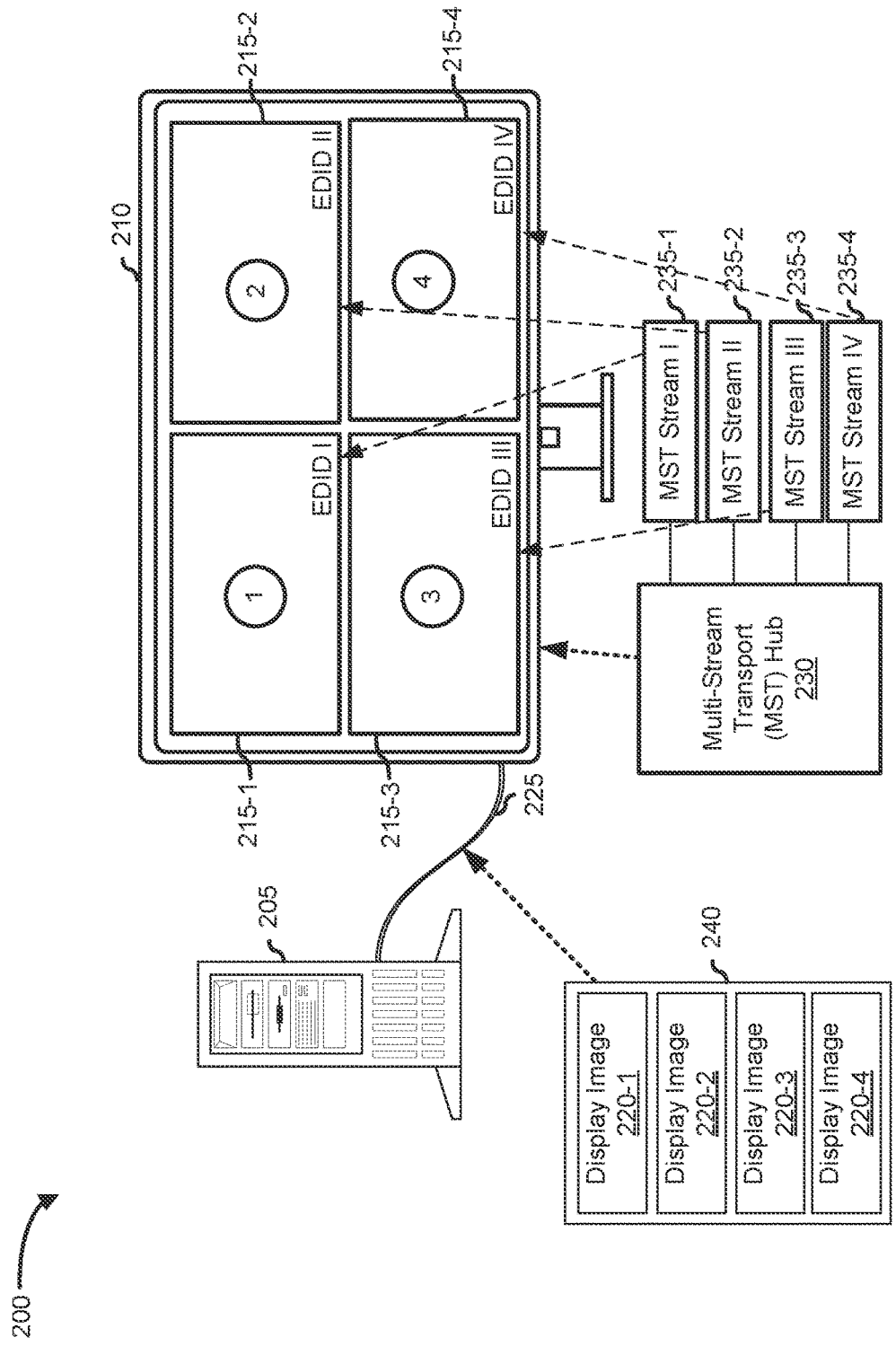
FIG. 2 is a block diagram illustrating a system for automatic configuration of sub-display positions in multi-stream transport (MST) mode, according to an embodiment of the present disclosure.

FIG. 2 shows a system 200 for automatic configuration of sub-display positions in MST mode. System 200 includes an information handling system 205, which is similar to information handling system 100 of FIG. 1, and a display device 210. In this example, information handling system 205 has a desktop configuration and presents visual information as visual images at display device 210. In another example, information handling system 205 may have a portable configuration with an integrated display that can also present visual information as visual images.

Information handling system 205 may be configured to communicate the visual information via a display cable 225. When in MST mode, the visual images may be sent from information handling system 205 as more than one display image, wherein each display image is presented in a display partition. The display image, which may be static or moving images such as a video display, presented in the display partition may be referred to as a sub-display. In this example, display images 220-1 through 220-4 are transmitted as an MST stream 240 from information handling system 205 to display device 210. Display cable 225 can be a DisplayPort™ cable or similar that accepts a plurality of display images through a DisplayPort MST protocol. The MST protocol allows multiple independent displays to be driven from a single port of information handling system 205. Display images that have the same product identifier and serial number may be transmitted and/or displayed in the same display device. Thus, an operating system and/or a graphics processing unit of information handling system 205 may group the display images with the same product identifier and serial number into one MST stream.

Display device 210 may present itself as four displays to accept four display images, MST display images 220-1 through 220-4 at four logical display partitions, display partitions 215-1 through 215-4, wherein each one of the display images has the same extended display identification data (EDID) serial number and product identifier. In this example, display device 210 includes display partitions 215-1 through 215-4, wherein display device 210 can display four different display images. However, display device 210 can include more or less than four display partitions. For example, display panel 410 of FIG. 4 includes three display partitions. Although display device 210 is shown as a peripheral display device, such as a display monitor or similar; display device 210 may be an integrated display device that is included in information handling system 205.

In one embodiment, a separate EDID is assigned for each display partition. In this example, each EDID includes one of the Roman numerals I, II, III, and IV in display partitions 215-1 through 215-4. Each of the numerals I, II, III, and IV shows a physical position of a sub-display in display device 210. A sub-display to be presented or presented at a particular physical location may be associated with the numeral associated with the EDID of that location. For example, a sub-display presented at display partition 215-1 may be referred to as sub-display I, a sub-display presented at display partition 215-2 may be referred to as sub-display II, a sub-display presented at display partition 215-3 may be referred to as sub-display III, and a sub-display presented at display partition 215-5 may be referred to as sub-display IV.

Display device 210 includes MST hub 230 which may be a DisplayPort compliant MST hub that is integrated into display device 210. MST hub 230 may be similar to MST hub 135 of FIG. 1. In this example, MST hub 230 receives display images 220-1 through 220-4 and outputs MST streams 235-1 through 235-4. Each MST stream is assigned a physical position in display partitions 215-1 through 215-4 as depicted by the Roman numeral associated with each MST stream. In this example, MST stream 235-1 is assigned the numeral "I" which depicts that it may be displayed in display partition 215-1. MST stream 235-2 is assigned the numeral "II" which depicts that it may be displayed in display partition 215-2. MST stream 235-3 is assigned the numeral "III" which depicts that it may be displayed in display partition 215-3. MST stream 235-4 is assigned a numeral "IV" which depicts that it may be displayed in display partition 215-4. Display device 210 includes a display controller which may then route a first display image stream to a first display partition based on a first EDID identifier. The display controller may also route the second display image stream to a second display partition based on a second EDID identifier, and so on.

Figure 3:
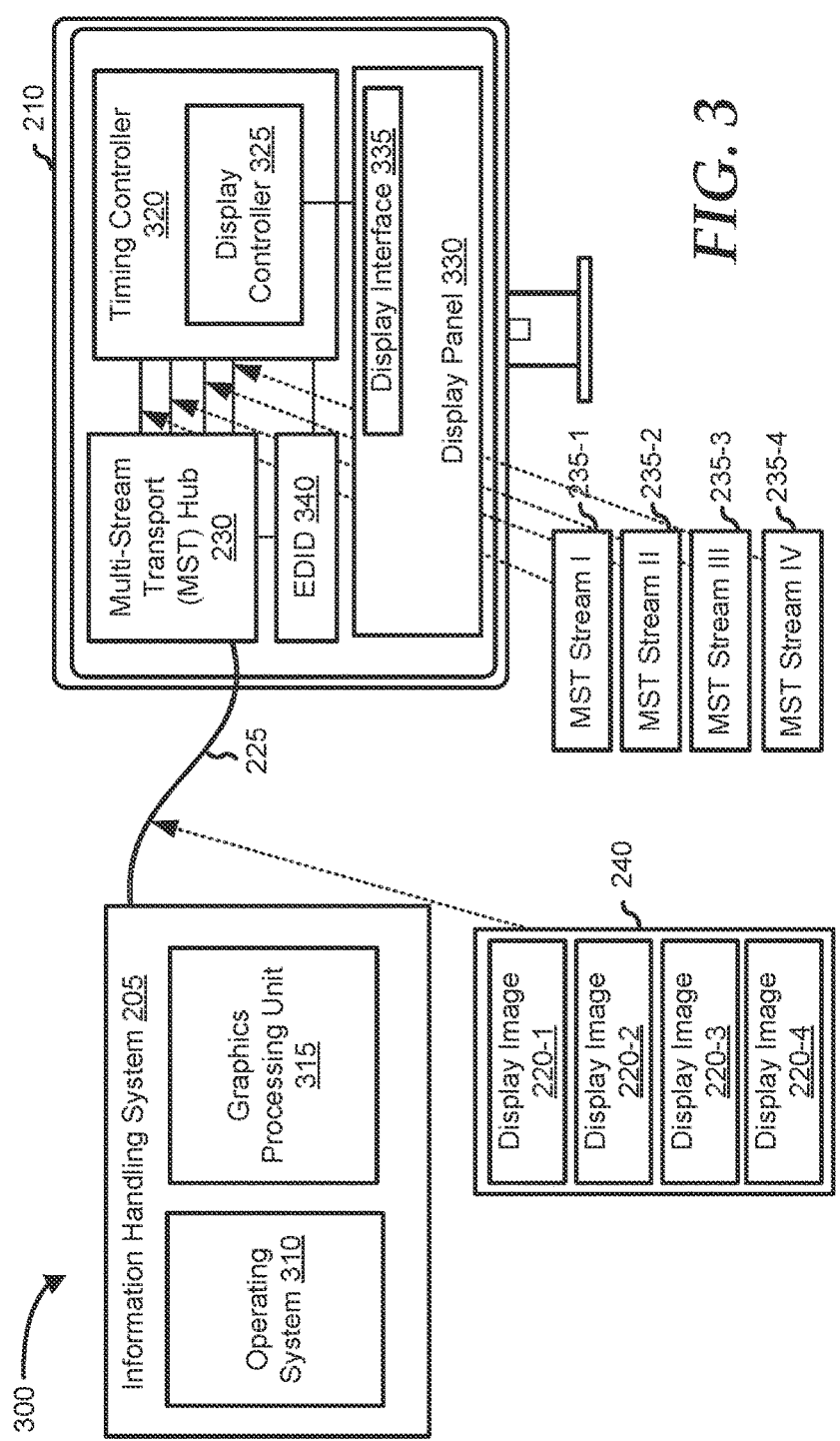
FIG. 3 is a block diagram illustrating a system for automatic configuration of sub-display positions in MST mode, according to an embodiment of the present disclosure.

FIG. 3 shows a more detailed diagram of system 200 for automatic configuration of sub-display positions in MST mode. Information handling system 205 includes an operating system 310 and a graphics processing unit 315. Display device 210 includes MST hub 230, a timing controller 320, and a display panel 330. Further, timing controller 320 includes a display controller 325 while display panel 330 includes a display interface 335.

Information handling system 205 generates visual information at a central processing unit, such as by executing operating system 310 and providing the visual information to graphics processing unit 315. Graphics processing unit 315 creates pixel values that define a visual image. Operating system 310 and/or graphics processing unit 315 in information handling system 205 may be configured to automatically adjust an operating screen layout to match the layout of display partitions in display panel 330 without user intervention. In addition to matching the layout of the display partitions in display panel 330, operating system 310 and graphics processing unit 315 may render content at each display partition at a native resolution of each display partition.

Display device 210 may include an on-screen display menu that is presented to a user to allow the user to select a display mode, such as between single stream transport (SST) mode or MST mode. The SST mode presents a single display image in display panel 330. The MST mode may present a number of display images in a corresponding number of display partitions. For example, the user may select a layout that includes three display partitions, such as shown in display panel 410 of FIG. 4. The user may instead select a layout that includes four display partitions, such as shown in display panel 510 of FIG. 5. For example, timing controller 320 integrates flash memory or other non-transitory memory that executes instructions to present the on-screen display and manage selections through a user interface and an EDID 340.

When the user selects the MST mode or changes the layout of the display partitions, operating system 310 and/or graphics processing unit 315 may automatically adjust the display images transmitted to display device 210 based on a current layout of the display partitions and the resolution of each partition. For example, operating system 310 and/or graphics processing unit 315 may transmit a setup video or graphics pattern, also referred to as setup display pattern, during an MST setup process. The setup display pattern may include two or more sub-displays, also referred to as tiles, having defined resolutions and encoded display locations. The location of each sub-display may be encoded in pixels, such as by using color patches or gray levels. For example, the color red may be associated with a first sub-display location, green with a second sub-display location, blue with the third sub-display location, and yellow with a fourth sub-display location. Prior to transmitting the setup display patterns to display panel 330, display controller 325 may use histogram analysis or a pixel sampler to determine the encoded color of each tile and re-order the tile as applicable. Display controller 325 may re-order the tiles according to pre-defined sub-display locations.

Operating system 310 may transmit display images 220-1 through 220-4 to display device 210 via display cable 225, wherein display images 220-1 through 220-4 may be included in the setup display pattern during the MST mode setup process. In another example, display images 220-1 through 220-4 may be video or graphical images transmitted by the information handling system during normal display operations after the MST mode setup process. MST hub 230 may detect the display images and respond with multiple display stream outputs, such as MST streams 235-1 through 235-4 that display panel 330 presents each MST stream at separate display partitions. In particular, MST hub 230 may direct each display stream output to one of several receive channels of timing controller 320 which may blend the display streams into a timing controller scan.

Timing controller 320 may include a receive port for each channel output by MST hub 230. In this example, timing controller 320 includes four receive ports, wherein a first receive port is associated with MST stream 235-1, a second receive port is associated with MST stream 235-2, a third receive port is associated MST stream 235-3, and a fourth receive port is associated with MST stream 235-4. Timing controller 320 further includes a display controller 325, also referred to as a scaler, that transmits the blended display streams to display panel 330 via display interface 335. Display interface 335 may be an embedded DisplayPort, Vx1, or similar image transfer interface. Display controller 235 may direct each one of the display streams, such as MST streams 235-1 through 235-4 to a display partition at a resolution of the partition.

Each of the components of FIG. 2 and FIG. 3 can be implemented with hardware and/or software, including virtual machines. In various embodiments, information handling system 205 may not include each of the components shown in FIG. 2 and FIG. 3. Additionally, or alternatively, information handling system 205 may include various additional components in addition to those that are shown in FIG. 2 and FIG. 3. Furthermore, some components that are represented as separate components in FIG. 2 and FIG. 3 may in certain embodiments instead are integrated with other components. For example, in certain embodiments, all or a portion of the functionality provided by the illustrated components may instead be provided by components integrated into one or more processor(s) as a system-on-a-chip.

Those of ordinary skill in the art will appreciate the configuration, hardware, and/or software components of information handling system 205 depicted in FIG. 2 and FIG. 3 may vary. For example, the illustrative components within information handling system 205 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 4:
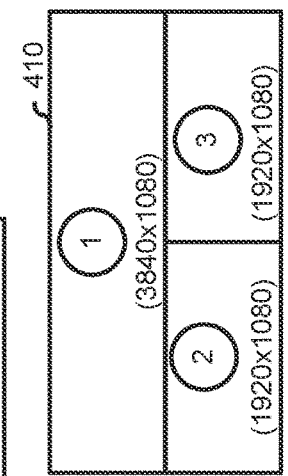
FIG. 4 is a diagram illustrating a display panel with three display partitions, according to an embodiment of the present disclosure.

FIG. 4 shows a diagram of a display panel 410 with three display partitions. Display panel 410 is similar to display panel 330 of FIG. 3. In this example, display panel 410 has a resolution of 3840×2160 pixels and includes three display partitions. One of the display partitions has a resolution of 3840×1080 pixels while the other two partitions each have a resolution of 1920×1080 pixels.

Figure 5:
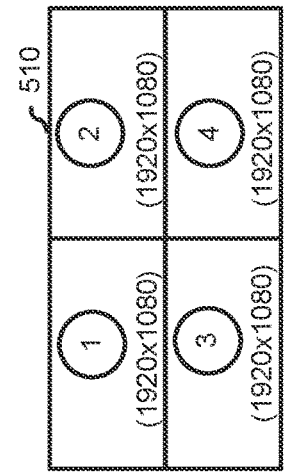
FIG. 5 is a diagram illustrating a display panel with four display partitions, according to an embodiment of the present disclosure.

FIG. 5 shows a diagram of a display panel 510 with four display partitions. Display panel 510 is similar to display panel 330 of FIG. 3. In this example, display panel 510 has a resolution of 3840×2160 pixels and includes four display partitions. Each one of the display partitions has a resolution of 1920×1080 pixels. Display panel 510 may be partitioned similarly to display panel 330 of FIG. 3 as shown in FIG. 2.

Figure 6:
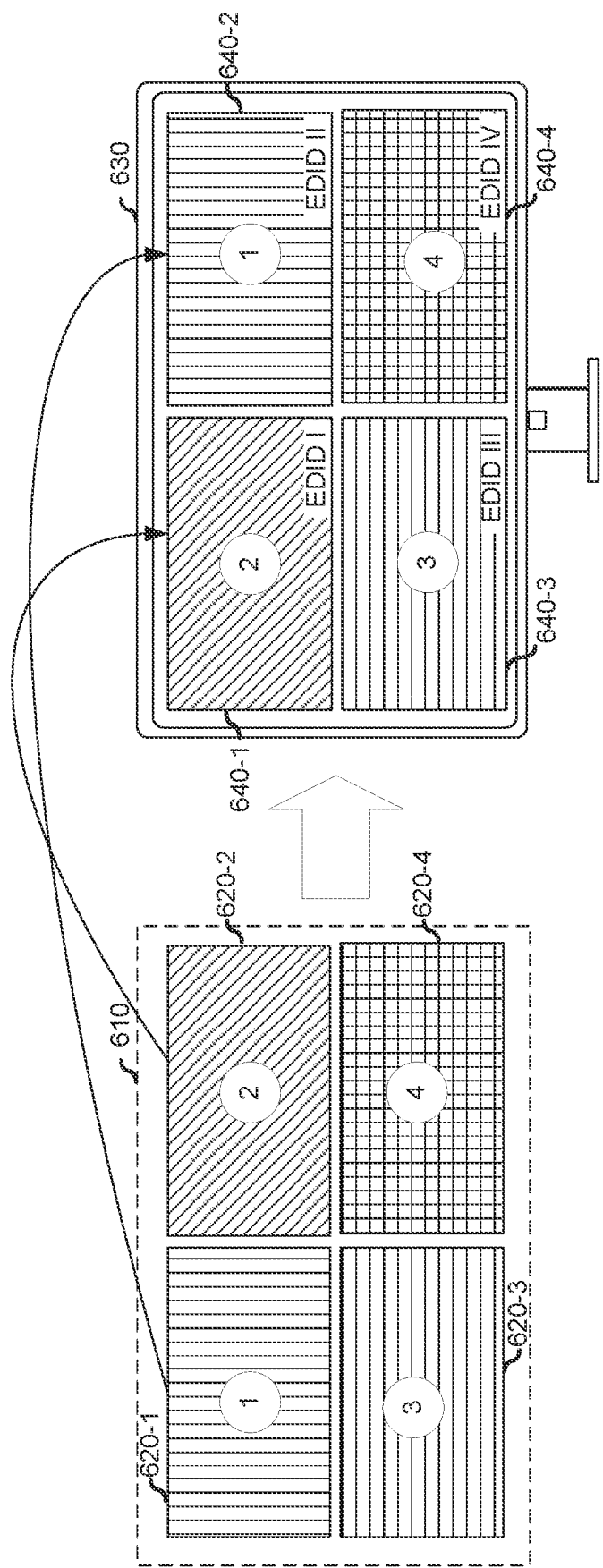
FIG. 6 is a diagram for automatic configuration of sub-display positions in MST mode, according to an embodiment of the present disclosure.

FIG. 6 shows a diagram for automatic configuration of sub-display positions in MST Mode. FIG. 6 includes an MST stream 610 which is a full-screen color patch output by an operating system and/or graphics processing unit during an MST setup process. The diagram also includes a display device 630 that includes display partitions 640-1 through 640-4. MST stream 610 may be a setup display pattern that includes display images 620-1 through 620-4, wherein each display image is a color patch. Each of display images 620 may be of a different color or shade of gray. In addition, each of display images 620 may be encoded with its location in the display panel. A sub-display position associated with the sub-display input may be used to identify a display partition. For example, a sub-display input with a sub-display position of sub-display I, wherein I refers to the EDID identifier, may identify display partition 640-1.

Operating system 805 may transmit various sub-display inputs with a different color patch for each sub-display input to display device 630. For example, display 620-1 may have a red color with an RGB value of (255,0,0) for sub-display I which is display partition 640-1. Display 620-2 may have a green color with an RGB value of (0,255,0) for sub-display II, which is display partition 640-2. Display 620-3 may have a blue color with an RGB value of (0,0,255) for sub-display III, which is display partition 640-3. Display 620-4 may have a yellow color with an RGB value of (255,255,0) for sub-display IV, which is display partition 640-4.

In one example, the sub-display I have a pre-defined green color with the RGB value of (0,255,0), the sub-display II may have a pre-defined red color with an RGB value of (255,0,0), the sub-display III may have a pre-defined blue color with the RGB value of (0,0,255), and the sub-display IV may have a pre-defined yellow color with the RGB value of (255,255,0). For example, display device 810 or in particular, a display controller may compare the color patch received for sub-display I which has the RGB value of (255,0,0) with the pre-defined RGB value of (0,255,0). In this case, the RGB values do not match. Thus, the display controller may determine which of the received sub-displays have the RGB value of (0,255,0), which is display image 620-2. The display controller may then determine that display image 620-2 was initially associated with the operating system for sub-display II. The display controller may then swap the sub-display positions of the two display images. Thus, the display controller may swap the display image for sub-display I with the display image for sub-display II. Accordingly, the display controller may swap the display image for sub-display II with the display image for sub-display I. After the swap, the display controller may compare the RGB value in each of the sub-displays with the pre-defined RGB values and perform another swap until the current RGB values match the pre-defined RGB values. Thus, the swap of the display images may be used to correct the positions of the display images based on a pre-defined color patch.

Figure 7:
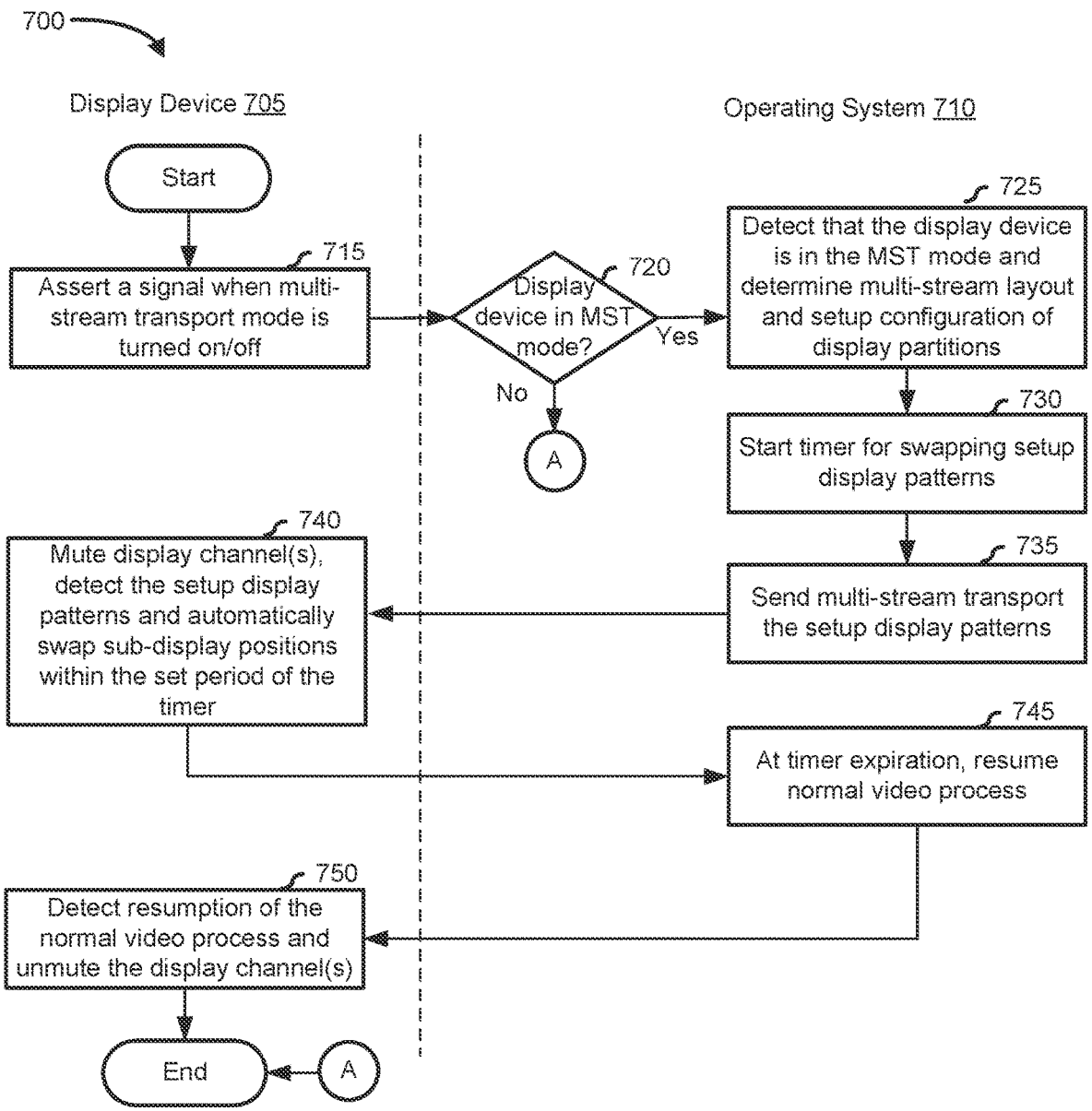
FIG. 7 is a flowchart illustrating a method for automatic configuration of sub-display positions in MST mode, according to an embodiment of the present disclosure.

FIG. 7 shows a flowchart of a method 700 for automatic configuration of sub-display positions in MST mode. Method 700 may be performed by a display device 705, which is similar to display device 210 of FIG. 2, and an operating system 710, which is similar to the operating system 310 of FIG. 3. Method 700 may be performed when there is no support for display communication channels, such as display data channel/command interface (DDC/CI) between display device 705 and operating system 710. It should be recognized that other systems may be utilized to perform the described method. Method 700 may be an overall process performed that includes an assertion of the MST mode phase, detection of the MST mode, and MST mode setup process. The assertion phase includes block 715 while the detection phase includes block 725 and MST mode setup process includes blocks 730, 735, 740, 745, and 750. One of skill in the art will appreciate that this flowchart explains a typical example, which can be extended to advanced applications or services in practice.

Method 700 typically starts at block 715 where display device 705 may assert a signal to operating system 710 when there is a change in MST status. Conversely, display device 705 may de-assert the hot plug signal when MST mode is turned off. The MST status is on when MST mode is enabled or when single stream transport (SST) mode is disabled. The MST status is off when MST mode is disabled or when SST mode is enabled. For example, display device 705 may transmit a hot-plug signal to operating system 710 when MST mode is turned on or off.

Display device 705 may assert the signal when the MST mode is turned on or off as this may change the number of display partitions. For example, when MST mode is disabled, display device 705 may display a single image. When MST mode is enabled, display device 705 may be partitioned into a number of display partitions. The method proceeds to decision block 720, where the method determines whether the MST mode is enabled or not. When MST mode is not enabled, then it may be assumed that a single stream transport mode is enabled. If the MST mode is enabled, then the "YES" branch is taken, and the method proceeds to block 725. If the MST mode is not enabled, then the "NO" branch is taken, and the method ends.

At block 725, operating system 710 and/or a graphics processing unit may detect that the display device is in the MST mode, such as when operating system 710 and/or the graphics processing unit receives the signal from display device 705. After receiving the signal, operating system 710 and/or the graphics processing unit suspends a normal display process, also referred to as a video/graphics process, and determines an MST layout, also referred to as display partition layout, and a setup configuration of the display partitions in display device 705. The MST layout may refer to the layout of the display partitions of display device 705. For example, operating system 805 may determine the resolution associated with each sub-display. Operating system 805 may then configure the positions of each of the display images based on the pre-defined MST layout of the display device. The setup configuration may include adjacency of one display partition to other display partitions based on the number of partitions and their resolutions.

After determining the current layout of display device 705, operating system 710 to block 730 where operating system 710 may start a timer for configuring of sub-display positions of display images at MST mode before the timer expires. The timer may specify a minimum length of time that may elapse, wherein display device 705 may automatically swap MST sub-display positions as applicable. The minimum period may be used to maintain a color patch before operating system 710 resumes the normal display process. The minimum period may be pre-defined during the manufacturing process of display device 705. The method may proceed to block 735.

At block 735, operating system 710 may send setup display patterns for MST setup configuration. The setup display patterns may be in different color patches which are packed in an MST format and transmitted to display device 705 through a single cable. Each of the setup display patterns may have EDID information that includes a serial number and product identifier of display device 705. In addition, each of the setup display patterns may include an EDID identifier and product identifier of the display partition where the setup display pattern is to be displayed. The method proceeds to block 740 where display device 705 may mute an N number of display channels. Display device 905 may detect each of the setup display patterns from operating system 710 and compare the color patch and display partition association with a pre-defined color path and display partition association. Based on the comparison it may be determined whether the color patch should be redirected to a different display partition and/or swap display partitions with another color patch.

When the timer expires, the method may proceed to block 745 where operating system 710 may resume the normal display process. Operating system 710 may also transmit a signal to display device 705 to indicate that the normal display process has resumed. At 750, display device 705 may detect the resumption of the normal display process. For example, display device 705 may receive the signal from operating system 710 which indicates the resumption of the normal display process. Upon detection of the resumption of the normal display process, display device 705 may unmute the N number of display channels, also referred to as video channels. At this point, display device 705 may unmute the N number of display channels. The display images received from operating system 910, similar to MST display images 220-1 through 220-4 of FIG. 2, may be automatically mapped to display partitions according to the MST layout as configured during the MST setup process.

Figure 8:
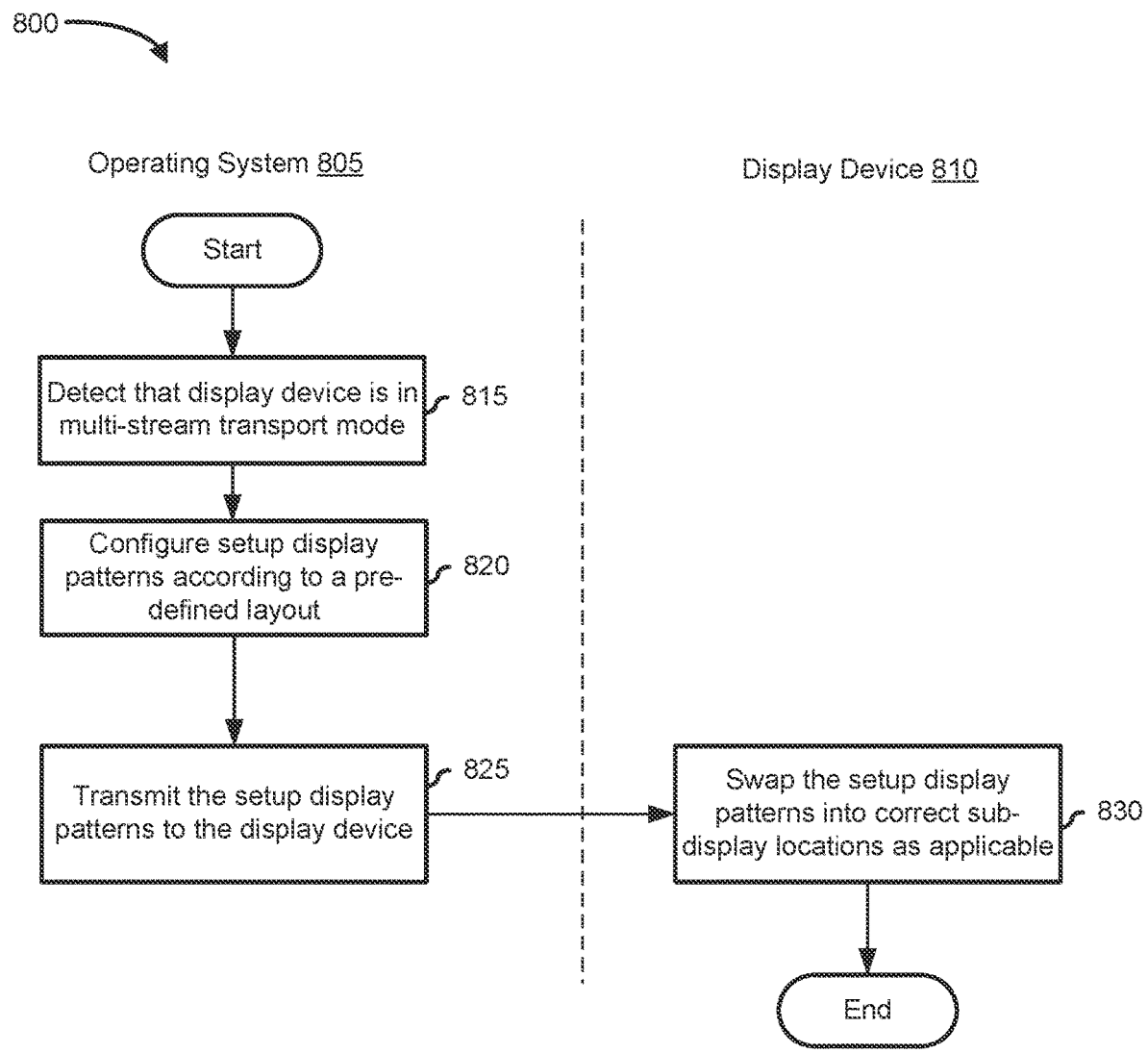
FIG. 8 is a flowchart illustrating a method for automatic configuration of sub-display positions in MST mode, according to an embodiment of the present disclosure.

FIG. 8 shows a flowchart of a method 800 for automatic configuration of sub-display positions in MST mode. In particular, method 800 may show an MST setup process. Method 800 may be performed by a display device 810, which is similar to display device 705 of FIG. 7, and an operating system 805, which is similar to the operating system 310 of FIG. 3. Method 800 may be performed when there is no support for a display communication channel, such as DDC/CI between display device 810 and operating system 805. It should be recognized that other systems may be utilized to perform the described method. One of skill in the art will appreciate that this flowchart explains a typical example, which can be extended to advanced applications or services in practice.

Method 800 typically starts at block 815 where operating system 805 may detect that display device 810 is in MST mode. For example, operating system 805 may receive a signal from display panel 510 when MST mode is enabled. The signal may also be transmitted to notify operating system 710 to re-discover and/or re-enumerate display images, such as when resolution and topology of display device 705 may have changed. For example, before the MST mode is enabled, display device 705 may display one image with a preferred resolution, such as 3840×2160 pixels at 60 Hz. When the MST mode is enabled, display device 705 may be configured to display several images, wherein display device 705 is configured to have several virtual display partitions with a preferred resolution, such as 1920×1080 pixels at 60 Hz for each display partition. In addition, while in the MST mode, the display partitions may change from one number of display partitions to another number of display partitions, such as from four display partitions to three display partitions or vice versa.

The method may proceed to block 820, where operating system 805 may suspend a normal display process and configure MST display images to be transmitted to display device 810 according to MST layout of display device 810. For example, operating system 805 may query DisplayPort configuration data (DPCD), such as product number, firmware, hardware version, etc. Operating system 805 may also query EDID for operational characteristics of display device 810, such as its native resolution, manufacturer identifier, serial number, product identifier, horizontal size, vertical size, etc. Both the DPCD and the EDID information are stored in a monitor controller which is read by operating system 8710 and/or graphics processing unit when the signal is asserted by display device 705.

Based on the information from display device 705, operating system 710 and/or graphics processing unit may select an MST layout from an inverse lookup table that maps a list of partition size and number of partitions, such as table 1000 of FIG. 10. For example, when a user selected four display partitions, display device 705 may report four EDIDs, with a resolution of 1920×1080 pixels for each EDID. Based on the received four EDIDs and their resolutions, operating system 710 and/or the graphics processing unit may perform a lookup on table 1000 and determine that the current layout of display device 705 is MST layout no. 8. In certain cases wherein the resolutions of two MST layouts are the same, such as MST layout number 4 and 5, additional information may be added for each EDID to differentiate between the two layouts. For example, the MST layout number may be attached or added to the EDID. The method may proceed to block 825, where operating system 805 or a graphics processing unit may transmit a full screen of video setup patterns also referred to as display setup patterns. The display setup patterns may include color patches of distinct colors, such as red, blue, green, yellow, etc.

The method proceeds to block 830 where display device 810 may detect a color patch in each of the sub-display locations or display partitions and compare each of the color patches to a pre-defined color patch for that display partition until a match is found. Display device 810, which may be similar to display device 210 of FIG. 2, may compare the color patch and display partition association with a pre-defined color patch and display partition association. Based on the comparison it may be determined whether that color patch should be redirected to a different display partition. For example, as shown in FIG. 6 if the red color patch received is associated with display partition 640-1 but the red color patch should be for display partition 640-2 instead.

It may also be determined that the green color patch should be for display partition 640-1 instead of display partition 640-2.

Based on these determinations, display device 630 may reorder or swap the color patches for display partitions 640-1 and 640-2. For example, the setup display pattern with the green color patch may be associated with display partition 640-1 and the setup display pattern with the red color patch may be associated with display partition 640-1. Thus, display image 620-2 may be rendered at display partition 640-1, and display image 620-1 may be rendered at display partition 640-2 in accordance with the pre-defined color patch and display partition association. Although the example referred to herein utilizes color patches for the video or display setup patterns, other display setup patterns may be utilized. For example, the display setup patterns may be based on a grayscale, wherein the range of the grayscale is based on the number of partitions.

Figure 9:
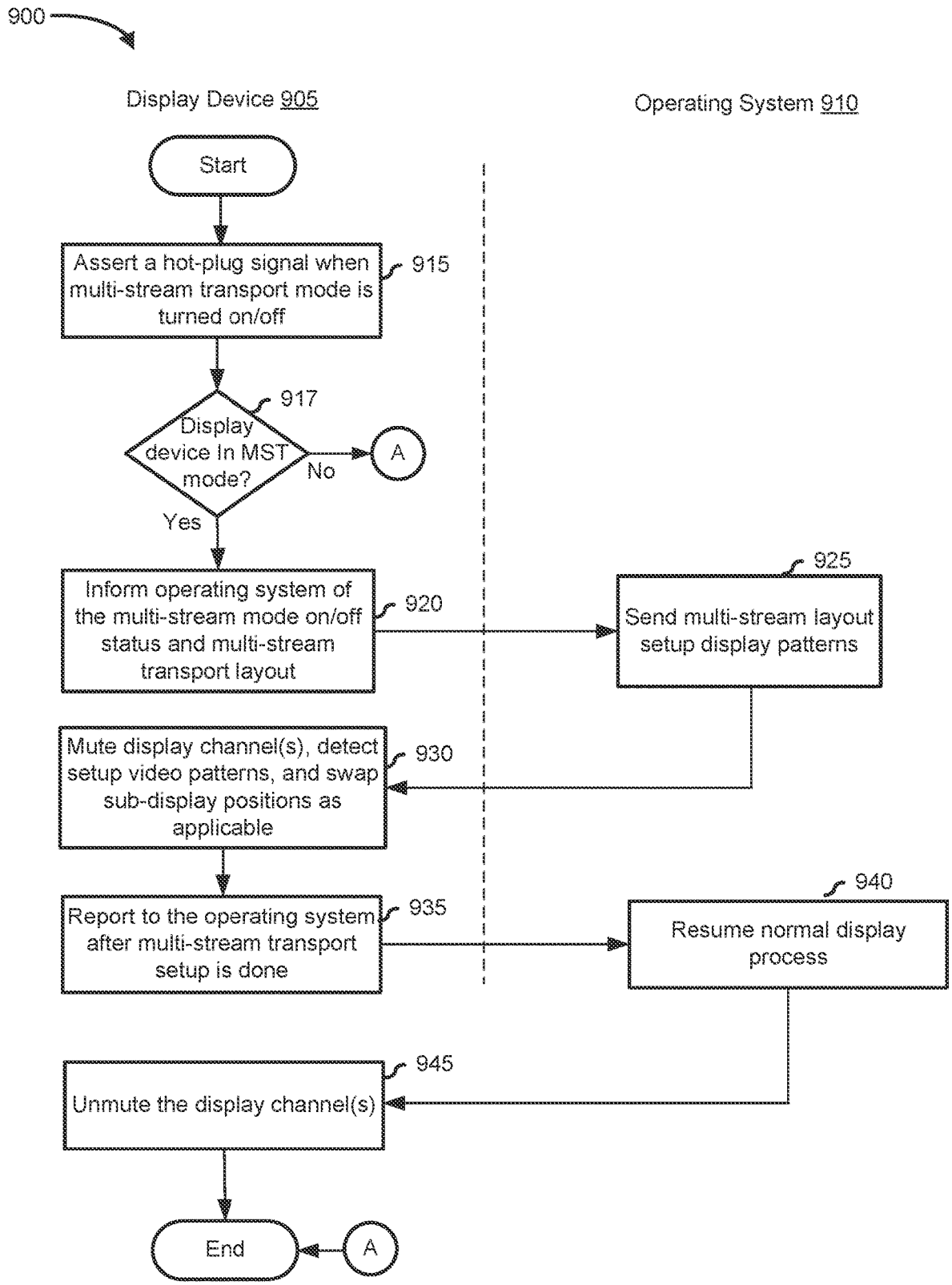
FIG. 9 is a flowchart illustrating a method for automatic configuration of sub-display positions in MST mode, according to an embodiment of the present disclosure.

FIG. 9 shows a flowchart of a method 900 for automatic configuration of sub-display positions in MST mode. Method 900 may be performed when there is support for a display communication channel, such as DDC/CI between display device 905 and operating system 910. Method 900 may be performed by a display device 905, which is similar to display device 210 of FIG. 2, and an operating system 910, which is similar to the operating system 310 of FIG. 3. It should be recognized that other systems may be utilized to perform the described method. Method 900 may be an overall process performed that includes an assertion of the MST mode phase, detection of the MST mode, and MST mode setup process. The assertion phase includes block 915 while the detection phase includes block 920 and the MST mode setup process includes blocks 925, 930, 935, 940, and 945. One of skill in the art will appreciate that this flowchart explains a typical example, which can be extended to advanced applications or services in practice.

Method 900 typically starts at block 915, where display device 905 may assert a hot-plug signal when MST transport is enabled or turned on. Correspondingly, display device 905 may de-assert the hot plug signal when the MST mode is disabled or turned off. The method may proceed to decision block 917, where it determines whether display device 905 is in MST mode. If display device 905 is in MST mode, then the "YES" branch is taken, and the method proceeds to block 920. If display device 905 is not in MST mode, then the "NO" branch is taken, and the method ends. At block 920, display device 905 may inform operating system 910 of an on/off status of the MST mode. For example, display device 905 may inform operating system 910 whether the MST mode is enabled or disabled. If the MST mode is enabled, display device 905 may also suspend normal display process. Display device 905 may also inform operating system 910 of the MST layout of its display panel. The method proceeds to block 925.

At block 925, operating system 910 may send setup display patterns for MST setup configuration. The setup display patterns may be transmitted in different streams which are packed in an MST format and transmitted to display device 905 through a single cable. Each of the setup display patterns may include a different color patch and associated display partition. In addition, each of the setup display patterns may include an EDID identifier and product identifier of the display partition where the setup display pattern is to be displayed. The method proceeds to block 930 where display device 905 may mute an N number of display channels. Display device 905 may detect each of the setup display patterns from operating system 910 and compare the color patch and display partition association with a pre-defined color path and display partition association. Based on the comparison it may be determined whether the color patch should be redirected to a different display partition and/or swapped with another color patch.

Method 900 may proceed to block 935 where display device 905 may transmit a report to operating system 910 after the MST setup is done. For example, display device 905 may transmit a signal to operating system 910 and/or the graphics processing unit. The method proceeds to block 940 where operating system 910 may resume the normal display process. The method proceeds to block 945, where display device 905 may unmute the N number of display channels. The display images received from operating system 910 may be automatically mapped to display partitions according to the MST layout as configured during the MST setup process.

FIG. 10 shows a table 1000 that maps a list of partition sizes and number of partitions to MST layouts. Table 1000 may be an inverse lookup table or similar data structure for mapping MST layouts to number and resolutions of display partitions. Table 1000 includes columns 1005, 1010, and 1015. Column 1005 includes various MST layout numbers. Column 1010 includes an MST layout associated with each of the MST layout numbers while column 1015 shows a description for each MST layout. The description may include information received and/or queried from a display device, such as when an operating system and/or a graphics processing unit receives an assertion from the display device. For example, the guest operating system and/or the graphics processing unit may receive a report from the display device that includes four EDIDs, wherein each EDID has a resolution of 1920×1080 pixels at 60 Hz.

As used herein, a hyphenated form of a reference numeral associated with a display image refers to a specific instance of the display image, wherein a numeral after the hyphen refers to a display logic identifier as enumerated by the operating system or the graphics processing unit. For example, display image 220-1 refers to an instance of a display image, wherein "-1" refers to the display logic identifier.

Although FIG. 7, FIG. 8, and FIG. 9 show example blocks of method 700, method 800, and method 900 in some implementations, method 700, method 800, and method 900 may include additional blocks, fewer blocks, different blocks, or differently arranged blocks than those depicted in FIG. 7, FIG. 8, and FIG. 9. Those skilled in the art will understand that the principles presented herein may be implemented in any suitably arranged processing system. Additionally, or alternatively, two or more of the blocks of method 700, method 800, and method 900 may be performed in parallel. For example, blocks 725 and 730 of method 700 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
in response to detecting, by a processor, that a display device is in a multi-stream transport (MST) mode, determining a display partition layout of the display device, wherein a first display partition is associated with a first pre-defined encoding, wherein a second display partition is associated with a second pre-defined encoding;
transmitting setup display patterns in the MST mode according to the display partition layout of the display device, wherein the setup display patterns include a first display pattern and a second display pattern, wherein the first display pattern is associated with the first display partition and a first encoding, and wherein the second display pattern is associated with the second display partition and a second encoding;

routing the first display pattern to the first display partition and the second display pattern to the second display partition;

comparing the first encoding of the first display pattern with the first pre-defined encoding of the first display partition and comparing the second encoding of the second display pattern with the second pre-defined encoding of the second display partition; and in response to determining that the first encoding of the first display pattern does not match the first pre-defined encoding and the second encoding does not match the second pre-defined encoding, swapping the first display pattern with the second display pattern.

2. The method of claim 1, further comprising querying the display device for a number of display partitions of the display device.

3. The method of claim 2, further comprising querying the display device for a resolution of each one of the display partitions.

4. The method of claim 2, wherein the setup display patterns include a different color patch for each one of the display partitions.

5. The method of claim 1, wherein the swapping of the first display pattern with the second display pattern is performed within a pre-defined period.

6. The method of claim 1, wherein the determining of the display partition layout of the display device is based on a lookup table.

7. The method of claim 1, wherein each of the setup display patterns include an extended display identification data serial number.

8. An information handling system, comprising:
a processor; and
a memory storing instructions that when executed cause the processor to perform operations including:
in response to detecting that a display device is in a multi-stream transport (MST) mode, determining a display partition layout of the display device, wherein a first display partition is associated with a first pre-defined encoding, wherein a second display partition is associated with a second pre-defined encoding;
transmitting setup display patterns in the MST mode according to the display partition layout of the display device, wherein the setup display patterns include a first display pattern and a second display pattern, wherein the first display pattern is associated with the first display partition and a first encoding, and wherein the second display pattern is associated with the second display partition and a second encoding;
routing the first display pattern to the first display partition and the second display pattern to the second display partition;
comparing the first encoding of the first display pattern with the first pre-defined encoding of the first display partition and comparing the second encoding of the second display pattern with the second pre-defined encoding of the second display partition; and
in response to determining that the first encoding of the first display pattern does not match the first pre-defined encoding and the second encoding does not match the second pre-defined encoding, swapping the first display pattern with the second display pattern.

9. The information handling system of claim 8, wherein the operations further comprise querying the display device for a number of display partitions of the display device.

10. The information handling system of claim 9, wherein the operations further comprise querying the display device for a resolution of each one of the display partitions.

11. The information handling system of claim 9, wherein the setup display patterns include a different color patch for each one of the display partitions.

12. The information handling system of claim 8, wherein the swapping of the first display pattern with the second display pattern is performed within a pre-defined period.

13. The information handling system of claim 8, wherein the determining of the display partition layout of the display device is based on a lookup table.

14. A non-transitory computer-readable medium to store instructions that are executable to perform operations comprising:
in response to detecting that a display device is in a multi-stream transport (MST) mode, determining a display partition layout of the display device, wherein a first display partition is associated with a first pre-defined encoding, wherein a second display partition is associated with a second pre-defined encoding;
transmitting setup display patterns according to the display partition layout of the display device, wherein the setup display patterns include a first display pattern and a second display pattern, wherein the first display pattern is associated with the first display partition and a first encoding, and wherein the second display pattern is associated with the second display partition and a second encoding;
routing the first display pattern to the first display partition and the second display pattern to the second display partition;
comparing the first encoding of the first display pattern with the first pre-defined encoding of the first display partition and comparing the second encoding of the second display pattern with the second pre-defined encoding of the second display partition; and
in response to determining that the first encoding of the first display pattern does not match the first pre-defined encoding and the second encoding does not match the second pre-defined encoding, swapping the first display pattern with the second display pattern.

15. The non-transitory computer-readable medium of claim 14, wherein the operations further comprise querying the display device for a number of display partitions of the display device.

16. The non-transitory computer-readable medium of claim 15, wherein the operations further comprise querying the display device for a resolution of each one of the display partitions.

17. The non-transitory computer-readable medium of claim 15, wherein the setup display patterns include a different color patch for each one of the display partitions.

18. The non-transitory computer-readable medium of claim 14, wherein the swapping of the first display pattern with the second display pattern is performed within a pre-defined period.

19. The non-transitory computer-readable medium of claim 14, wherein the determining of the display partition layout of the display device is based on a lookup table.

20. The non-transitory computer-readable medium of claim 14, wherein each of the setup display patterns include an extended display identification data serial number.

* * * * *